United States Patent [19]

Erickson

[11] Patent Number: 4,652,279
[45] Date of Patent: Mar. 24, 1987

[54] THERMALLY STABLE NONCORROSIVE WATER VAPOR ABSORBENT

[76] Inventor: Donald C. Erickson, 1704 S. Harbor Ln., Annapolis, Md. 21401

[21] Appl. No.: 722,784

[22] Filed: Apr. 12, 1985

Related U.S. Application Data

[63] Continuation-in-part of Ser. No. 520,305, Aug. 4, 1983, Pat. No. 4,563,295.

[51] Int. Cl.$^4$ .............................................. B01D 53/28
[52] U.S. Cl. ......................................... 55/32; 55/281; 55/388
[58] Field of Search .................... 55/29, 32, 281, 388, 55/390; 252/194, 387

[56] References Cited

U.S. PATENT DOCUMENTS

| | | | |
|---|---|---|---|
| 1,812,548 | 6/1931 | Obermiller | 55/32 |
| 1,909,823 | 5/1933 | Forrest et al. | 55/32 X |
| 2,214,354 | 9/1940 | Snelling | 252/194 X |
| 2,928,030 | 3/1960 | Lighty | 252/194 X |
| 3,885,926 | 5/1975 | Manning et al. | 55/29 |
| 4,452,715 | 6/1984 | Hirozawa | 252/387 X |
| 4,534,794 | 8/1985 | Walter et al. | 252/387 X |

FOREIGN PATENT DOCUMENTS

2842697 12/1979 Fed. Rep. of Germany .

*Primary Examiner*—Robert Spitzer

[57] ABSTRACT

A liquid mixture of alkali metal nitrates and excluding nitrite anions is disclosed which is useful for reveribly absorbing and desorbing useful quantities of water vapor. The mixture in noncorrosive to mild steel and thermally stable up to temperatures at least as high as 260° C., and finds application in absorption cycles and in air drying cycles.

11 Claims, 1 Drawing Figure

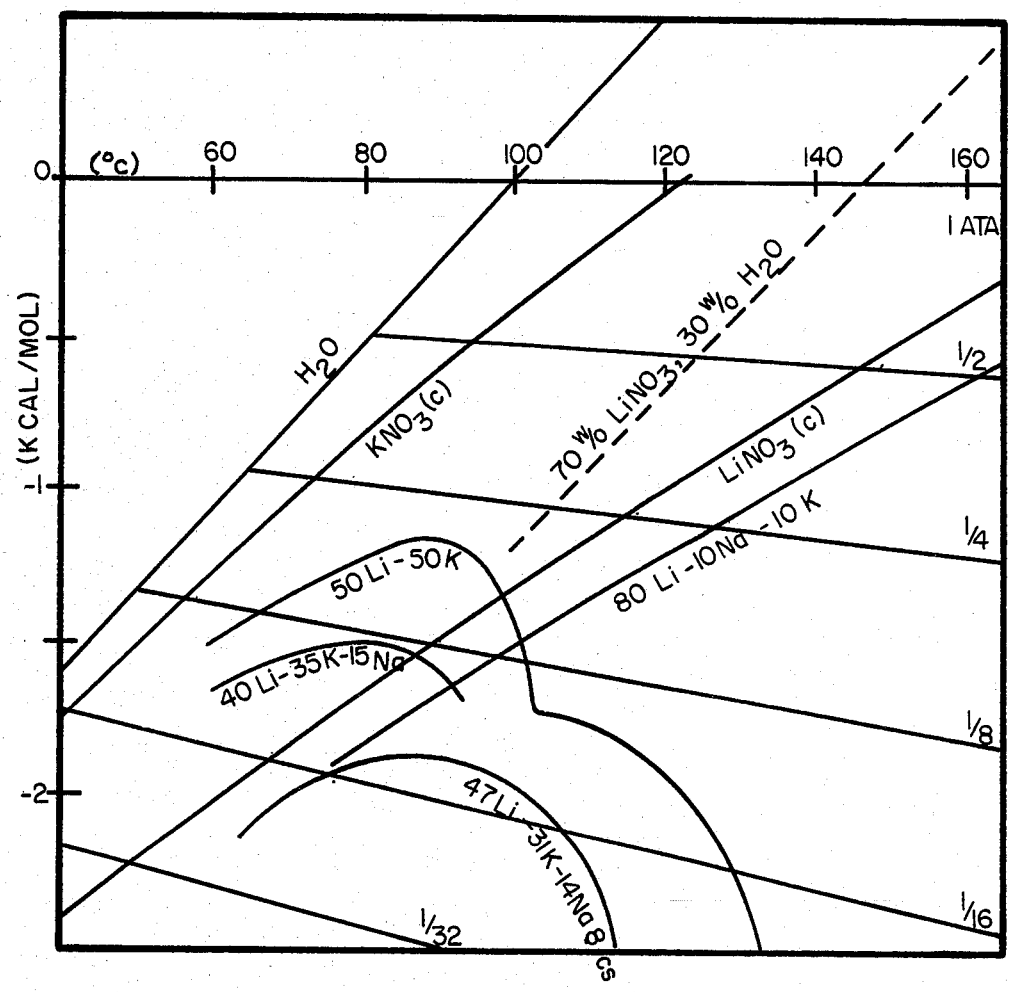

4,652,279

THERMALLY STABLE NONCORROSIVE WATER VAPOR ABSORBENT

TECHNICAL FIELD

This invention relates to solution compositions which absorb and desorb useful quantities of water vapor at high boiling point elevation, and are useful in air drying apparatus and in absorption cycle devices such as heat pumps. The solution and the absorption cycles which employ it are particularly advantageous at high temperatures, e.g., up to 260 degrees C. and even higher.

BACKGROUND

This application is a continuation-in-part of application No. 06/520,305 filed by Donald C. Erickson on 08/04/83, which is incorporated by reference now U.S. Pat. No. 4,563,295.

There has long been an identified need for solution compositions useful for absorbing substantial amounts of water vapor at high temperature and at high boiling point elevations, but which can use ordinary materials of construction without causing excessive corrosion. This is especially true in absorption cycle processes or apparatus, such as air conditioners or heat pumps—both high temperature, heat powered (forward cycle) and waste heat powered (reverse cycle), absorption heat pumps, and also in drying apparatus for air or other gases.

There are many problems in the prior art practice of regenerative water vapor absorption using a liquid solution. Some absorbents such as LiBr and LiCl beocme excessively corrosive above about 170 degrees C. Others such as the glycols become thermally unstable at high regeneration temperatures, and also have appreciable vapor pressure and are combustible. Prior art West German patent No. 2942697 discloses that a mixture of $LiNO_2$, $LiNO_3$, $NaNO_2$, $NaNO_3$, $KNO_2$, $KNO_3$, and water can be used as a water vapor absorbent, as can the individual components. The alkali metal nitrates are neither corrosive nor thermally unstable at high temperature. However they become unstable when mixed with alkali metal nitrites, and they have other problems when used individually, such as limited range of solubility, limited boiling point elevation, excessively high anhydrous melting point, or limited water carrying capacity.

Further background information can be found in the technical article "A High Temperature Noncorrosive Absorption Working Pair" presented by D. C. Erickson on Mar. 21, 1985 at the Absorption Experts '85 meeting in Paris, France and sponsored by Institut Francais du Petrol, and also in International Publication Number W084/01422.

DISCLOSURE OF INVENTION

In accordance with the present invention, a liquid absorbent solution for absorbing water vapor is provided which is comprised of 0 to 50 weight percent water and which has an anhydrous component consisting essentially of at least 35 mole percent $LiNO_3$, at least 10 mole percent of at least one of $NaNO_3$ or $KNO_3$, plus between 0 and 20 weight percent of at least one of a $CsNO^3$ and $RbNO_3$, and which contains essentially no nitrite anion. This absorbent solution finds use in both processes and apparatus for gas drying and also in absorption cycle processes or apparatus for transferring heat from colder to warmer temperatures, particularly for heat pumping at temperatures above ambient.

BRIEF DESCRIPTION OF THE DRAWING

The single FIGURE illustrates the thermodynamic properties of several different individual or mixtures of alkali metal nitrates on coordinates of temperature (T, degrees C.) versus $RT \ln P$ (Kcal/mol), with P in atmospheres absolute. The constant pressure contours marked in ATA can be converted to kPa by the conversion factor 1 ATA=101.3 kPa.

BEST MODE FOR CARRYING OUT THE INVENTION

There are many different desirable properties of a water vapor absorbent solution, as enumerated above. The relative importance of each property will vary depending upon the conditions under which the water vapor absorption is desired to be conducted, e.g., what temperature, water vapor pressure, boiling point elevation, margin to crystallization, etc., is required. One discovery reported by this invention is that the combination of properties achievable by mixtures of alkali metal nitrates is unexpectedly greatly improved over the properties attainable by individual alkali metal nitrates. A second and equally important discovery is that by varying the mixture proportions different desirable properties can be optimized, without excessive degradation of other important properties, and hence the solution mixture composition can be fine tuned to give optimum performance at the desired use conditions.

The water vapor pressure at which the absorption or desorption occurs is always a key parameter in water vapor absorption processes. In absorption cycle processes, the condenser and evaporator temperatures determine the high and low vapor pressures of the cycle. In three temperature cycles, the difference in their temperatures is the lift or boiling point elevation of the cycle or absorbent.

The FIGURE shows the crystallization limits (maximum boiling point elevation) of different compositions as a function of temperature and water vapor pressure. For example, at a water vaor pressure of ¼ ATA (190 mm Hg or approximately 25 kPa), which would obtain if the evaporator (forward cycle) or condenser (reverse cycle) is at 64.5 degrees C., the $KNO_3$ solution crystallizes at 74.5 degrees C., for a maximum boiling point elevation of 10 degrees C. The $LiNO_3$ solution will recrystallize at 116 degrees C. (51.5 degrees C. max bpe), and the 80 mole percent (m/o) $LiNO_3$, 10 m/o $NaNO_3$, 10 m/o $KNO_3$ solution begins to solidify at 126 degrees C. On the other hand, the three remaining solution mixtures illustrated will not solidify at a water vapor pressure of ¼ ATA regardless of what their concentration or temperature is.

It should be noted that the solidification boundaries illustrated on the FIGURE repesent the onset of crystallization/solidification, i.e., the liquidus point, and that they are only approximate since subcooling effects were frequently observed during the experimental measurements.

A second parameter of importance is the solution concentration at a given boiling point elevation. In general, the greater the $LiNO_3$ content, the lower the solution concentration will be at a given boiling point elevation. This is because $LiNO_3$ has the greatest negative deviation from Raoultian behavior of all the alkali metal nitrates. The practical effect of this, in comparing two cycles in which all temperatures are equal, is that the absorbent solution containing more LiNO$_3$ will require less pumping power and experience less solution heat exchange loss, thus resulting in a better cycle COP. Among the remaining alkali metal cations, this effect is experienced to a lesser extent simply due to molecular weight, i.e., lower molecular weight mixtures require less pumping power, all other factors remaining the same.

From the above information, the strategy of mixture composition selection can be deduced. Knowing the minimum water vapor pressure during operation, and the desired temperature lift, a margin to crystallization is applied to determine the minimum solidification temperature desired at that vapor pressure. Then the salt mixture having maximum LiNO$_3$ content and minimum CsNO$_3$ and RbNO$_3$ content (due to cost considerations) under that crystallization constraint is selected. Then that basic composition can be further modified according to special requirements, such as shutdown dilution requirements, anhydrous melting point, etc.

Three examples will illustrate the above procedure. Consider first a forward cycle evaporator operating at 81 degrees C. (50 kPa pressure) and an absorber at 146 degrees C. The overall lift by the absorption cycle is 65 degrees C., and the useful lift will be reduced from that amount by the heat exchanger temperature differentials. Allowing a 15 degrees C. margin to crystallization, a salt mixture is desired having a crystallization temperature of 161 degrees C. or higher at a water vapor pressure of 50 kPa. FIG. 1 shows that the 80 m/o Li-10 m/o Na-10 m/o K nitrate mixture begins to crystallize at about 165 degrees C. at that vapor pressure, and hence would serve very nicely. For lower crystallization temperatures, even more Li can be present. At these very high concentrations of Li, the relative proportions of Na and K makes very little difference—the selection of either one singly would provide almost the same effect as the combination. Thus binary alkali metal nitrate mixtures (Li—K or Li—Na) are particularly useful for water vapor pressures above about 30 kPa and LiNO$_3$ contents above about 70 m/o. Other Li-containing binaries (Li—Cs or Li—Rb) would be equally acceptable except for cost considerations. The inclusion of at least 5 to 10 m/o of at least one of NaNO$_3$ and KNO$_3$ extends the solubility limit sufficiently to make it much easier to avoid solidification during shutdown and cooldown to ambient, regardless of whether the added boiling point elevation is necessary during operation.

In a lower pressure regime, say a 56 degrees C. evaporator (or condenser) yielding a water vapor pressure of 16.5 kPa, it is no longer possible to achieve usefully high lifts with a binary mixture, and the ternary Li—Na—K is required. Consider a desired absorber temperature of 110 degrees C. at 16.5 kPa. For a 10 degrees C. margin, a crystallization temperature of >120 degrees C. at 16.5 kPa is desired. The FIGURE shows that neither 50 Li-50 K nor 80 Li-10 Na-10 K would be acceptable. However, the 40 Li-35 K-15 Na would be acceptable—it has no effective crystallization limit at 16.5 kPa, and its only effective limit is the increasing solution concentration, which requires higher pumping power. Under these conditions, when the combined content of Na and K becomes greater than 30 m/o, the proportions of those two species become important. In order to obtain maximum extension of the solubility limit from a given combined content of Na and K, it is preferable that the K content be at least as great as the Na, and more preferably about twice the Na m/o.

It should be noted that it would be ill-advised to try to operate under the above conditions with the 50 Li-50 K mixture, even though the absorber appears to be outside the crystallization region. This is because there may be local cold spots/more dilute spots in the absorber which would experience crystallization, and once it started it would get progressively worse.

As a final absorption cycle example of the use of alkali metal nitrate mixtures as water vapor absorbents, consider a 44 degrees C. evaporator at a pressure of 9.1 kPa, and a desired absorber temperature of 94 degrees C. (50 degrees C. lift). At this pressure and lift the ternary mixtures cannot achieve a high enough crystallization temperature—it is necessary to adopt a quaternary or even quinary mixture, including some CsNO$_3$ and/or RbNO$_3$. The former is preferred due to its lower cost. The FIGURE shows that the mixture containing 47 Li, 31 , 14 Na, and 8 m/o CsNO$_3$ (17 weight percent CaNO$_3$) would be an acceptable absorbent for the absorption cycle operating at the above defined conditions. In general, for CsNO$_3$ (and/or RbNO$_3$) of at least about 5 w/o, and generally on the order of 10 to 20 w/o, the minimum possible operating water vapor pressure is substantially reduced below that possible with the ternary mixture.

As a final example application of this newly disclosed water vapor absorbent, it can be used to dry a moist gas such as compressed air. Compressed air normally exits the compressor at temperatures of 80 degrees C. or above (for pressures above 3 ATA), and conventional molecular sieve drying is done at about 10 degrees C., requiring energy for both refrigeration and for sieve regeneration. By using the alkali metal nitrate mixture as the moisture absorbent, the drying can be done directly at compressor discharge temperature, e.g., at 90 to 130 degrees C., which is a particular advantage when the dried air is to be further heated. The air can be dried to a "bone dry" condition provided essentially anhydrous nitrate mixture is supplied to a multistage countercurrent absorption tower. The salt exiting the absorber, containing several percent or more water, is regenerated at low pressure by atmospheric air, or when bone dry product is required, by part of the bone dry depressurized gas, e.g., some of the dried air or preferably exhaust nitrogen. Regeneration would also be done in a multistaged countercurrent contacting tower.

In the above application the anhydrous melting point of the mixture is very important, and hence the quaternary or quinary salt mixtures are of greater interest, since they make possible anhydrous melting points below the 120 degrees C. eutectic of the ternary Li—Na—K system. Temperature swing regeneration is also possible, in place of or in combination with the pressure swing regeneration described above.

In the absorption cycle applications, the salt mixture would almost alway contain at least two w/o H$_2$O, and usually much more. The specification of an alkali metal nitrate mixture does not preclude inclusion of minor amounts of other constituents such as alkaline earth nitrates or zinc nitrate. However, those constituents have lesser thermal stability and hence would not be included in mixtures intended for high use temperatures.

I claim:

1. A process for reversibly absorbing and desorbing water vapor comprising
   (a) contacting the water vapor with a liquid absorbent mixture comprised of 0 to 50 weight percent water and an anhydrous component consisting essentially of between 70 and 35 mole percent $LiNO_3$, at least 10 mole percent of both $NaNO_3$ and $KNO_3$, plus between 0 and 20 weight percent of at least one of $CsNO_3$ and $RbNO_3$, and which contains essentially no nitrite anion;
   (b) regenerating the liquid absorbent mixture for further absorption by separately desorbing water vapor from it; and
   (c) conducting at least one of said contacting and regenerating steps at a temperature above 170° C.

2. The process according to claim 2 in which the anhydrous component is less than 60 mole percent $LiNO_3$, at least 10 mole percent each of $NaNO_3$ and $KNO_3$, and between 5 and 20 weight percent $CaNO_3$, and comprising maintaining the water vapor pressure of at least one of the absorbing and desorbing steps below about 15 kPa.

3. The process according to claim 1 in which said water vapor is contained in a moist gas and said contacting step dries said moist gas, and in which said regenerating step further comprises contacting said liquid absorbent with a dry regeneration gas whereby essentially anhydrous absorbent is obtained.

4. An absorption cycle apparatus comprising a water vapor absorber and desorber wherein the improvement comprises a liquid absorbent solution consisting essentially of between 2 and 50 weight percent water and an anhydrous component consisting essentiall of between 70 and 35 mole percent $LiNO_3$, at least 10 mole percent of at least one of $NaNO_3$ or $KNO_3$, plus between 5 and 20 weight percent of at least one of $CsNO_3$ and $RbNO_3$, and which contains essentially no nitrite anion.

5. An apparatus for dyring a hot gas mixture such as compressed air comprising an absorber in which the moist gas is contacted with a liquid absorbent solution, a regenerator in which absorbed moisture is desorbed from the absorbent solution, and a liquid absorbent solution comprised of 0 to 50 weight percent water and an anhydrous component consisting essentially of at least 35 mole percent $LiNO_3$, at least 10 mole percent of at least one $NaNO_3$ or $KNO_3$, plus between 0 and 20 weight percent of at least one of $CsNO_3$ and $RbNO_3$, and which contains essentially no nitrite anion.

6. The apparatus according to claim 5 further comprising a supply of low pressure gas to the regenerator which carries away the desorbed water vapor and makes the absorbent anhydrous.

7. The apparatus according to claim 6 in which the anhydrous component is less than 70 mole percent $LiNO_3$, between 20 and 50 mole percent $KNO_3$, and between 5 and 25 mole percent $NaNO_3$.

8. The apparatus according to claim 6 in which the anhydrous component is less than 60 mole percent $LiNO_3$, at least 10 mole percent each of $NaNO_3$ and $KNO_3$, and between 5 and 20 weight percent $CsNO_3$.

9. The apparatus according to claim 6 in which the hot gas is compressed air and the regeneration gas is at least one depressurized constituent of air.

10. The apparatus according to claim 9 wherein the regeneration gas is atmospheric air.

11. The apparatus according to claim 9 wherein the regeneration gas is a depressurized constituent of the dried air.

* * * * *